Sept. 23, 1969 SHOJI MAKISHIMA 3,468,046

CARD SYSTEM OF IDENTIFICATION

Filed April 4, 1967

*INVENTOR.*
SHOJI MAKISHIMA

BY Steinberg & Blake

ATTORNEYS

Sept. 23, 1969   SHOJI MAKISHIMA   3,468,046
CARD SYSTEM OF IDENTIFICATION
Filed April 4, 1967   2 Sheets-Sheet 2
FIG.5
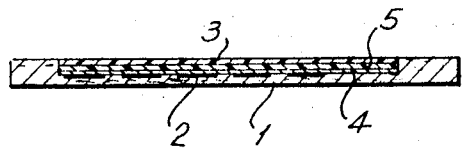
FIG.6
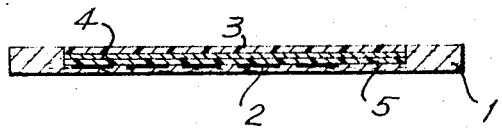
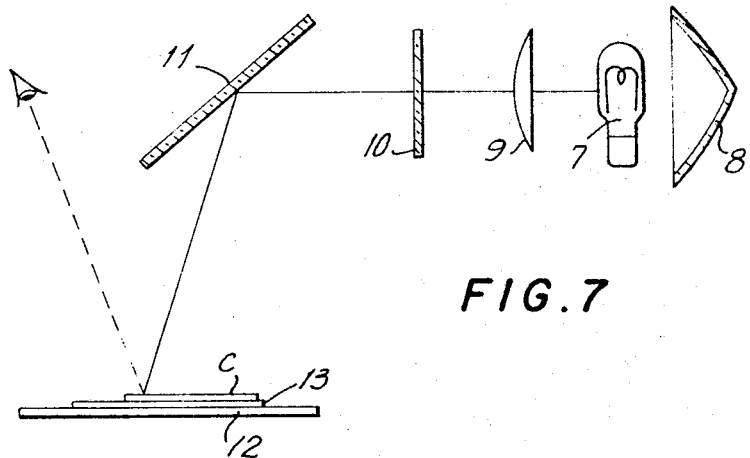
FIG.7
INVENTOR.
SHOJI MAKISHIMA
BY Steinberg + Blake
ATTORNEYS

United States Patent Office 3,468,046
Patented Sept. 23, 1969

---

3,468,046
CARD SYSTEM OF IDENTIFICATION
Shoji Makishima, Tokyo-to, Japan, assignor, by mesne assignments, to Eizo Komiyama, Ichikawa-shi, Chiba-ken, Japan
Filed Apr. 4, 1967, Ser. No. 628,482
Claims priority, application Japan, Sept. 5, 1966, 66/58,195
Int. Cl. G09f 3/02, 13/32
U.S. Cl. 40—2.2     10 Claims

ABSTRACT OF THE DISCLOSURE

An identification system for identifying an individual to whom a card such as a credit card is issued. The card has the form of a fluorescent screen carrying thereon non-fluorescent identifying indicia. An ultraviolet filter which is of the same color as the identifying indicia is located on the fluorescent screen covering the identifying indicia thereon so as to render this indicia invisible in the visible spectrum. When exposed to ultraviolet light, however, this latter light passes through the ultraviolet filter to provide fluorescence of the screen, whereas the nonfluorescent identifying indicia does not fluoresce so that it contrasts with the fluorescent screen, thus enabling this identifying indicia to become visible when exposed to ultraviolet light.

BACKGROUND OF THE INVENTION

The invention relates to a system for identifying individuals to whom a card such as a credit card is issued.

At the present time such systems enable individuals to carry out financial transactions without using cash. For example, a credit card may be presented to a retail establishment, a restaurant, or the like, when making a purchase therein, and by comparing the identifying indicia on the credit card, in the form of a suitable signature, account number, and the like, with identifying indicia placed upon a sales slip or the like, it becomes possible to identify the bearer of the card as the proper person to whom credit should be given. The same general considerations apply to banks where a depositor presents a passbook together with a suitable form on which the depositor places his signature when making a withdrawal, for example. In the latter case the signature on the withdrawal form is compared with that in the records of the bank so as to determine whether or not money can properly be paid out to the individual requesting the withdrawal. While systems of this general type have been recently improved, for example by the use of computers in the case of banks, nevertheless they suffer from certain serious drawbacks.

The most serious drawback is that the credit card or passbook can become lost or stolen so as to fall into the hands of unscrupulous individuals who will make use of these items to obtain either credit or cash in an unauthorized manner. As a result it becomes necessary for the true owner of the card or passbook to immediately notify the establishment which issues the card or the bank which issues the passbook that the card or passbook has become lost or stolen, so that steps to protect the establisment and the individual can be taken. However, even if the loss or theft is promptly noted, there is unavoidable interim during which it is possible for unauthorized use to be made of the credit card or passbook.

SUMMARY OF THE INVENTION

It is, therefore, a primary object of the present invention to provide a system according to which the possibility of unauthorized use of a credit card is greatly reduced.

In particular, it is an object of the present invention to eliminate, in the case of banks, the use of passbooks and instead to provide both for banks as well as for other commercial establishments a credit card system utilizing credit cards incapable of having their identifying indicia recognized when exposed to light in the visible spectrum.

More particularly, it is an object of the invention to provide a credit card of the above type which will render identifying indicia thereon visible only when exposed to ultraviolet light.

It is furthermore an object of the invention to provide for a system of the above type a structure which is as convenient in its use as any conventional credit card system.

According to the invention, the credit card takes the form of a fluorescent screen having thereon non-fluorescent identifying indicia, this latter indicia being covered by an ultraviolet filter. Thus, when this card of the invention is exposed to ultraviolet light, this light will pass through the filter to produce fluorescence of the fluorescent screen, while the non-fluorescent identifying indicia will contrast with the fluorescent screen so as to become visible. The non-fluorescent identifying indicia is preferably of the same color as the ultraviolet filter and may be either reflecting or absorbing or both with respect to the ultraviolet light. Located next to the ultraviolet filter is a translucent film made of a metal such as aluminum, chrome, silver, or the like, which can be vapor deposited, and this translucent film is coexistence with the filter with the latter arranged between the identifying indicia and the translucent film or with the translucent film arranged between the indicia and the ultraviolet filter. Both the filter and the translucent film together with the identifying indicia can be situated in a suitable recess on the fluorescent screen, and the entire assembly can be covered by a transparent film. To use the card it can be placed on a suitable support over a sheet such as a sales slip, withdrawal form for a bank, or the like, on which the bearer of the card has placed his signature, for example, and this support is located in the path of ultraviolet light issuing from a means which directs ultraviolet light to the support, so that in this way the operator can readily compare the signature provided in the presence of the operator, for example, on the sheet with the indicia on the fluorescent screen. While in the case of commercial establishments other than banks the procedure will be identical with normal procedure where entry is made on a sales slip, for example, to be compared with the indicia on the card, in the case of a bank there will be no passbook and instead the identification card will simply be used with a withdrawal form, and all of the records with respect to deposits and withdrawals will be kept by the bank so that by the use of a suitable computer, for example, it will be possible to make deposits or withdrawals after the individual who presents the card has been properly identified.

BRIEF DESCRIPTION OF THE DRAWINGS

The invention is illustrated by way of example in the accompanying drawings which form part of this application and in which:

FIG. 5 is a sectional view taken in a plane similar to that of FIG. 3 but showing still another embodiment of a structure of the invention;

FIG. 6 is a longitudinal sectional plane taken in a plane similar to that of FIG. 3 and showing a still further embodiment of a structure according to the invention; and FIG. 7 illustrates in a schematic manner how the structure of the invention is used in connection with a source of ultraviolet light.

DESCRIPTION OF PREFERRED EMBODIMENTS

Figure 1:
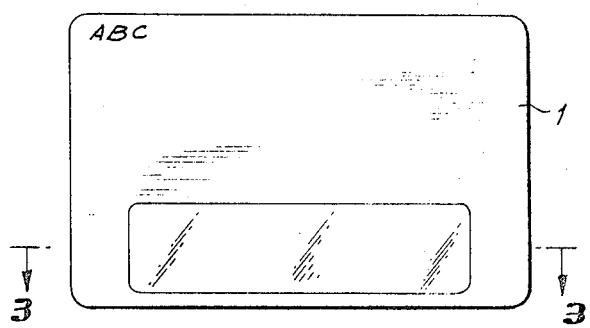
FIG. 1 is a front elevation of an identification card according to the invention.
Figure 2:
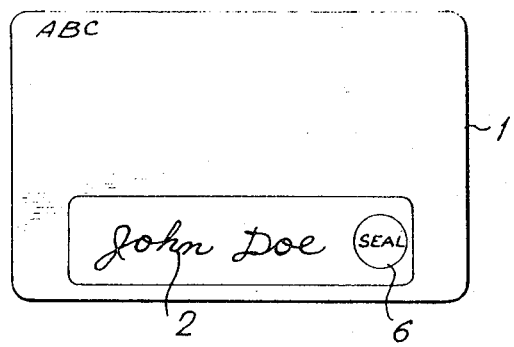
FIG. 2 shows the card of FIG. 1 with the identifying indicia thereof uncovered.

Referring now to the drawings, there is shown in FIG. 1 an identification card of the present invention, this card taking the form of a fluorescent screen 1. Thus, this screen is composed of a suitable sheet material whose surface is coated with a suitable fluorescent material. Adjacent its lower edge, as viewed in FIGS. 1 and 2, the fluorescent screen 1 is formed with a recess whose surface is coated also with fluorescent material, and at the bottom of this recess is located the identifying indicia in the form of a suitable signature 2 and/or a seal 6. This identifying indicia is located directly on the fluorescent coating, but the indicia itself is made of a non-fluorescent ink. This ink may be any conventional ink which will absorb and/or reflect ultraviolet light. On the other hand, ultraviolet light will produce fluorescence of the screen so that the identifying indicia which will not be rendered fluorescent by the light will contrast with the screen 1 when the latter is fluorescent as a result of exposure to light.

An ultraviolet filter 3 is located in the recess which accommodates the identifying indicia 2, 6 so as to cover this indicia and render it invisible in the visible spectrum. It is only when ultraviolet light travels through the filter 3 that the screen at the region of the identifying indicia 2, 6 becomes fluorescent to contrast with the identifying indicia which becomes visible under these conditions. Preferably the filter 3 is made of the same color as the identifying indicia, and any suitable color such as violet, blue, green, etc. can be selected.

There is located next to the filter 3, in coextensive relationship therewith, a translucent film made of metal and obtained by way of vacuum deposition because of the ease and low cost of this method of achieving the translucent film 4. This film 4 is located in the same recess as the filter 3 and the identifying indicia 2, 6.

Figure 3:
FIG. 3 is a longitudinal section of the card of FIG. 1 taken along line 3—3 of FIG. 1 in the direction of the arrows.
Figure 4:
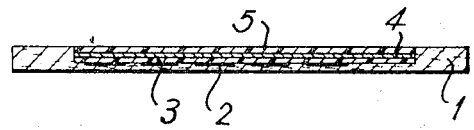
FIG. 4 is a sectional view taken in a plane similar to that of FIG. 3 but showing the details of a different embodiment of a structure of the invention.

In addition, there is located in this recess a transparent plastic filter 5 which is coextensive with the film 4 and the filter 3, so that the recess of the screen 1 is filled by the layers 3–5, as is apparent from FIGS. 4–6. However, in FIG. 3 the transparent plastic film 5 is omitted.

To achieve the structure of FIG. 3 the film 4 may be vapor deposited on the filter 3, this translucent film 4 being achieved by way of vapor deposition of aluminum, chrome, silver, or the like onto the filter 3. Then the filter 3 with the film 4 thereon is inserted into the recess with the film 4 situated between the indicia 2, 6 and the filter 3 to provide the structure shown in FIG. 3.

With the embodiment of FIG. 4 the filter 3 is placed in the recess of the screen 1 directly over the identifying indicia 2, 6. In this case the translucent film 4 is vapor deposited directly on the transparent plastic sheet 5 which thus carries the film 4. Then this assembly of layers 4, 5 is inserted into the recess with the translucent film 4 situated between the filter 3 and the transparent layer 5.

With the embodiment of FIG. 5, the translucent film 4 is vapor deposited onto the transparent plastic 5 in the same way as in the embodiment of FIG. 4. However, in FIG. 5 the assembly of layers 4, 5 is situated directly next to the indicia 2, 6 with the film 4 situated between the indicia and the transparent plastic 5, while the filter 3 is located over the plastic 5.

On the other hand, in FIG. 6 the transparent plastic layer 5 with the translucent metallic film 4 which has previously been vapor deposited thereon is inserted in a position which is inverted with respect to the position thereof shown in FIG. 5, so that the transparent plastic 5 is situated next to the identifying indicia while the translucent film 4 is situated between the transparent layer 5 and the ultraviolet filter 3.

Thus, with any of the above-described embodiments there will be situated on the fluoroscent screen the identifying indicia 2, 6 with the latter covered by the ultraviolet filter 3 which is preferably of the same color as the identifying indicia, and the additional layers 4 and 5 can be arranged in any sequence as described above and shown in the drawings. The remaining exposed surface of the screen 1 which is situated beyond the recess thereof can carry any printed matter such as suitable advertising matter.

As is schematically shown in FIG. 7, the system for comparing the identifying indicia with indicia placed on a sheet 13 includes the means shown at the upper part of FIG. 7 for directing ultraviolet light onto the identifying card C which may have any of the abovedescribed constructions shown in FIGS. 1 and 3–6. Thus, the sheet 13 may be a sales slip, or a deposit or withdrawal form of a bank, and it is located on a suitable support 12 which is situated in the path of light issuing from the means for providing the ultraviolet light rays. This latter means includes an ultraviolet lamp 7 which forms a source for the ultraviolet light. A reflector 8 is located on one side of the lamp 7 for reflecting the light therefrom through a converging or collecting lens 9 which in turn directs the light through an ultraviolet filter 10, the light which passes through the latter being reflected by a reflector 11 toward the support 12. Thus, when the card C of the invention is situated over the sheet 13 on the support 12 with the sheet 13 having situated beyond the lower edge of the card C the signature of the bearer of the card, for example, the operator will see not only this latter signature on the sheet 13 but also the identifying indicia on the card C. The structure which covers the identifying indicia, 2, 6 appears opaque in the visible spectrum and thus renders the identifying indicia invisible in the visible spectrum. However, when exposed to ultraviolet light, the screen 1 becomes fluorescent and contrasts with the light reflected and/or absorbed by the identifying indicia so that due to this contrast the latter indicia becomes visible and can be compared with the indicia which has been placed on the sheet 13. The filter 3 permits all ultraviolet light to pass through while the translucent film 4 also permits part of the ultraviolet light to pass. As a result, ultraviolet light rays that pass through the filter 3 and the translucent film 4 will reach the fluorescent coating on the screen to render the latter fluorescent, and the emitted visible fluoresence will be seen through the filter 3 and the film 4 whereas the identifying indicia will not emit any fluorescence inasmuch as the ultraviolet light is either reflected and/or absorbed by the identifying indicia. As a result the latter becomes dark enough to contrast with the fluorescent emission and thus will become visible.

Therefore, with the structure of the invention if the card C should become lost or stolen, the identifying indicia thereon will not be recognizable in the visible spectrum so that the possibility of unauthorized use of the card is very greatly reduced. On the other hand, in order to use the card in any commercial establishment it is only required to place it in a system as shown in FIG. 7 where a simple source of ultraviolet light can be directed onto the card to render the identifying indicia thereof visible. Particularly in the case of a bank great advantages are achieved because the conventional passbook becomes unnecessary and it is only required for the depositor to use the card while the bank keeps all of the records in a computerized ledger system, for example. Thus, the efficiency of the operations of a bank can be greatly enhanced with the invention.

What is claimed is:

1. In an identification system, a fluorescent screen, non-fluorescent identifying indicia carried by said screen, and an ultraviolet filter covering said indicia to render the latter invisible in the visible spectrum, so that when said screen is exposed to ultraviolet light the latter will pass through the filter to provide fluorescence of said screen while said indicia will contrast with said fluorescence to become visible, said filter and indicia being of the same color.

2. The combination of claim 1 and wherein a translucent film is located next to and is coextensive with said filter.

3. The combination of claim 2 and wherein said translucent film is made of a metallic material.

4. The combination of claim 2 and wherein said filter is situated between said indicia and said film.

5. The combination of claim 2 and wherein said film is located between said indicia and said filter.

6. The combination of claim 2 and wherein a transparent film covers that area of said screen which is covered by said filter and translucent film.

7. The combination of claim 6 and wherein said screen is formed with a recess in which said indicia, said filter, said translucent film, and said transparent film are located.

8. The combination of claim 1 and wherein a means coacts with said screen for directing ultraviolet light thereto.

9. The combination of claim 8 and wherein a support means is situated in the path of ultraviolet light provided by said means for supporting said screen in a position to receive the ultraviolet light with a sheet situated between said support means and said screen and carrying identifying indicia to be compared with that carried by said screen.

10. The combination of claim 1 and wherein said screen has the configuration and size of an identification card.

References Cited

UNITED STATES PATENTS

| | | | |
|---|---|---|---|
| 2,654,971 | 10/1953 | Harrison | 40—134 |
| 3,048,697 | 8/1962 | Cavanaugh | 283—7 |
| 3,245,697 | 4/1966 | Nugent | 40—2.2 X |

EUGENE R. CAPOZIO, Primary Examiner

W. J. CONTRERAS, Assistant Examiner

U.S. Cl. X.R.

250—219; 283—6